United States Patent
Kimura

(10) Patent No.: US 6,718,098 B2
(45) Date of Patent: Apr. 6, 2004

(54) TWO-WAY OPTICAL COMMUNICATION MODULE AND METHOD FOR MANUFACTURING THE SAME

(75) Inventor: Naoki Kimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/173,077

(22) Filed: Jun. 18, 2002

(65) Prior Publication Data

US 2003/0007735 A1 Jan. 9, 2003

(30) Foreign Application Priority Data

Jul. 3, 2001 (JP) ...................................... 2001-202410

(51) Int. Cl.[7] ........................... G02B 06/30; H04B 10/12
(52) U.S. Cl. ............................. 385/49; 385/14; 385/42; 385/39; 398/FOR 170; 398/173
(58) Field of Search .............................. 385/49, 41, 42, 385/39, 14, 32, 48; 398/FOR 170, FOR 164, 141, 173

(56) References Cited

U.S. PATENT DOCUMENTS

| 4,977,620 A | * 12/1990 | Smith et al. | 398/203 |
| 5,627,928 A | * 5/1997 | Matsuura et al. | 385/45 |
| 2002/0154864 A1 | * 10/2002 | Yasuda et al. | 385/49 |

FOREIGN PATENT DOCUMENTS

| JP | 04-306603 | 10/1992 |
| JP | 05-093825 | 4/1993 |
| JP | 05-210029 | 8/1993 |
| JP | 05-289120 | 11/1993 |
| JP | 05-333243 | 12/1993 |
| JP | 10-300960 | 11/1998 |

* cited by examiner

*Primary Examiner*—Edward J. Glick
*Assistant Examiner*—Krystyna Suchecki
(74) *Attorney, Agent, or Firm*—McGinn & Gibb, PLLC

(57) ABSTRACT

A two-way optical communication module is provided with: a first optical wave-guide including a light emitting element 2 for emitting a light with wavelength $\lambda 1$, a curved wave-guide portion (optical wave-guide 6) coupled to the light emitting element 2, and a straight wave-guide portion (optical wave-guide 8) coupled to a core 11 of an optical fiber 4; a second optical wave-guide including a light receiving element 3, a curved wave-guide portion (optical wave-guide 7) coupled to the light receiving element 3, and a straight wave-guide portion (optical wave-guide 9) coupled to a clad 12 of the optical fiber 4; and a directional optical coupler 10 which includes the optical wave-guides 8 and 9 and which guides the light with wavelength $\lambda 1$ from the optical wave-guide 6 to the core 11 and the light with wavelength $\lambda 2$ from the core 11 to the optical wave-guide 7. A leakage light can be guided out of the two-way optical communication module through the clad 12, thus suppressing occurrence of a stray light reflected irregularly therein.

14 Claims, 14 Drawing Sheets

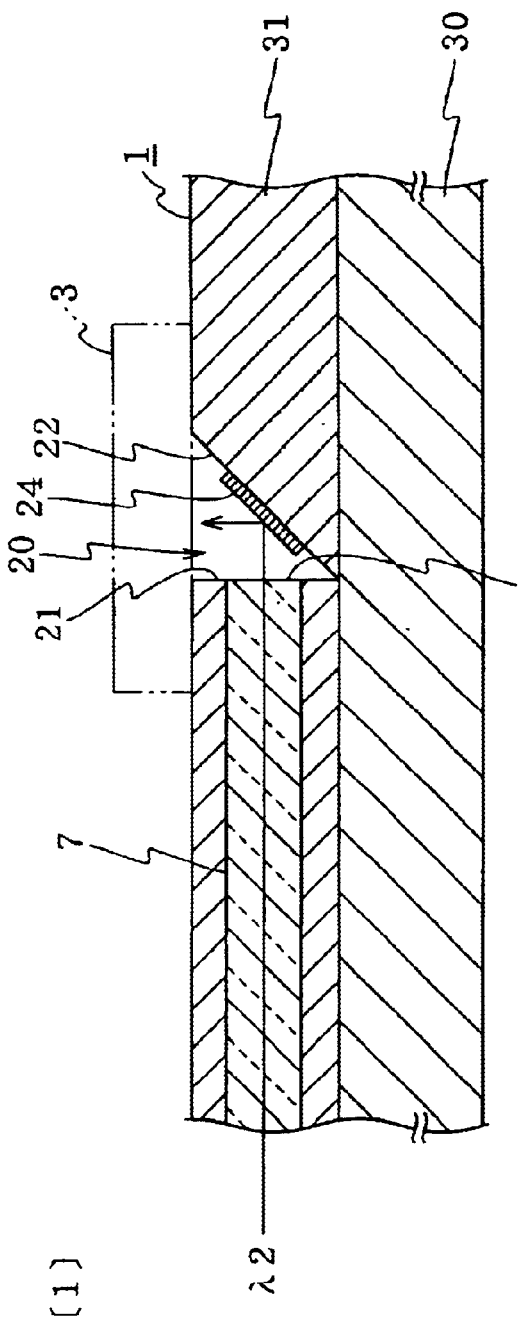
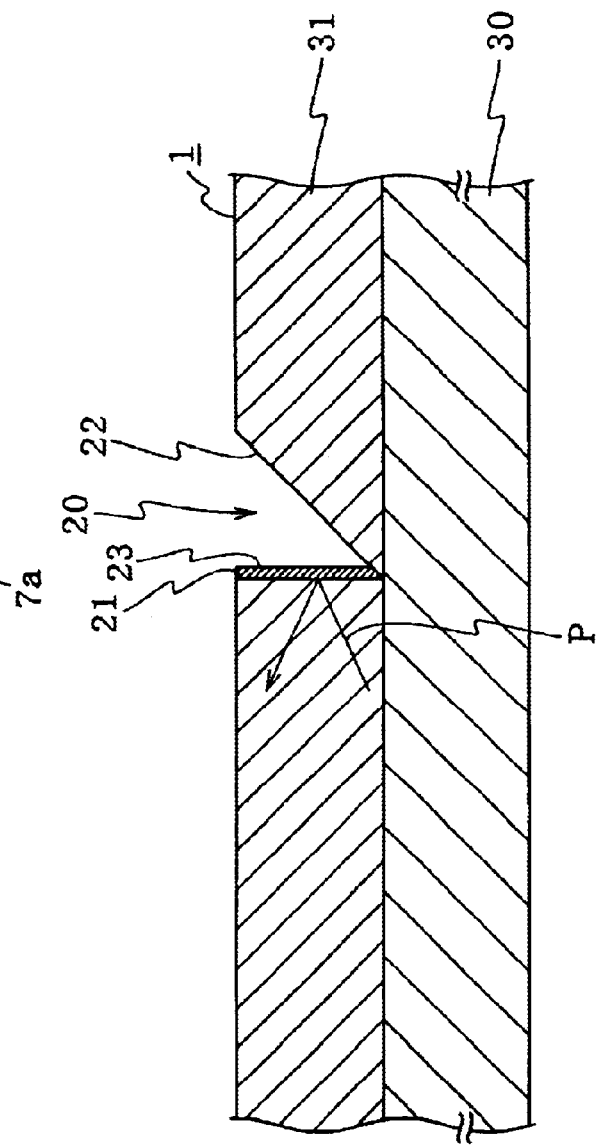
FIG. 9   FIG. 9

*FIG.10* [1]
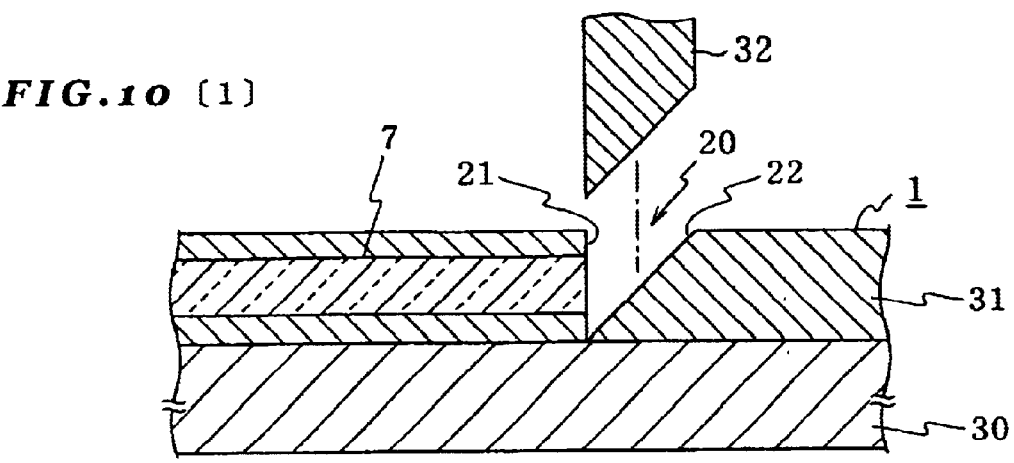
*FIG.10* [2]
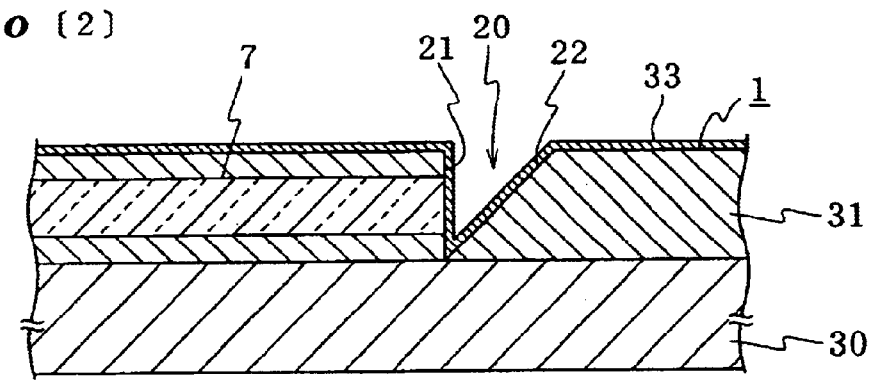
*FIG.10* [3]
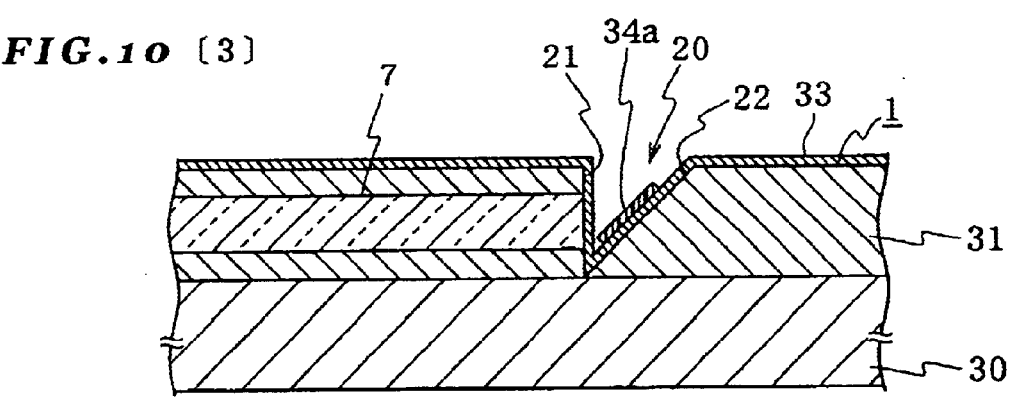
*FIG.10* [4]
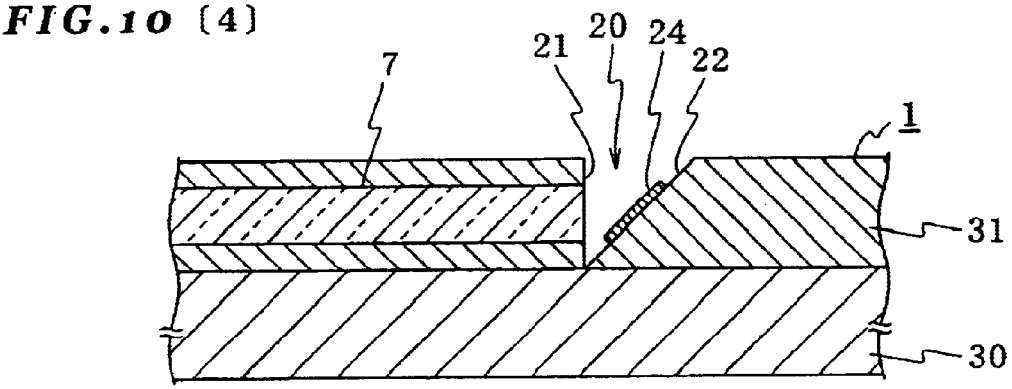

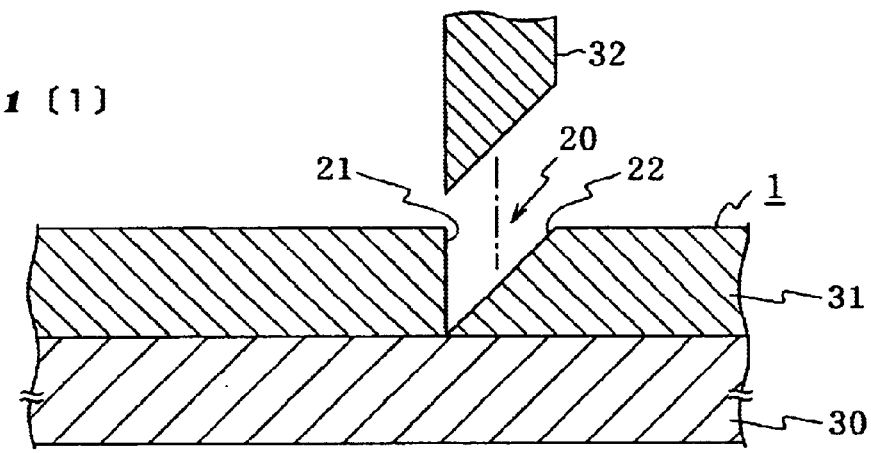
FIG. 11 (1)
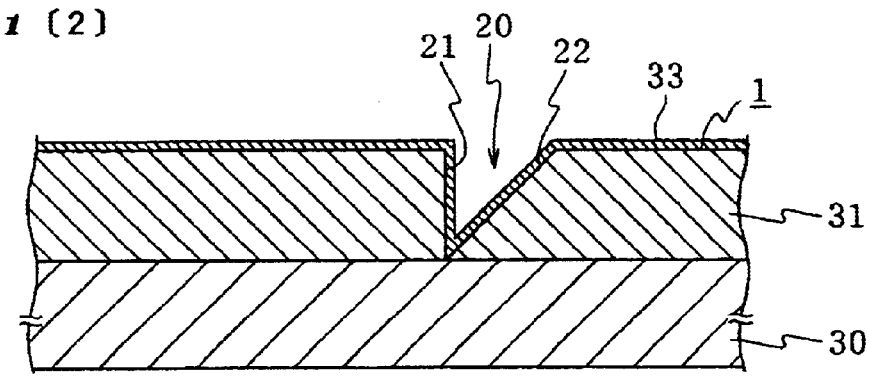
FIG. 11 (2)
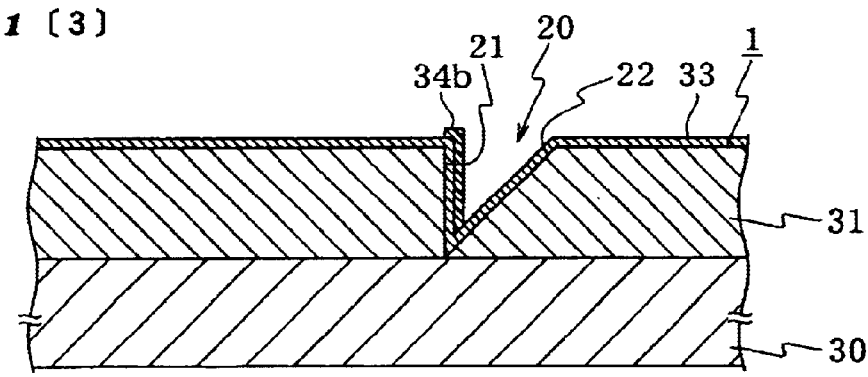
FIG. 11 (3)
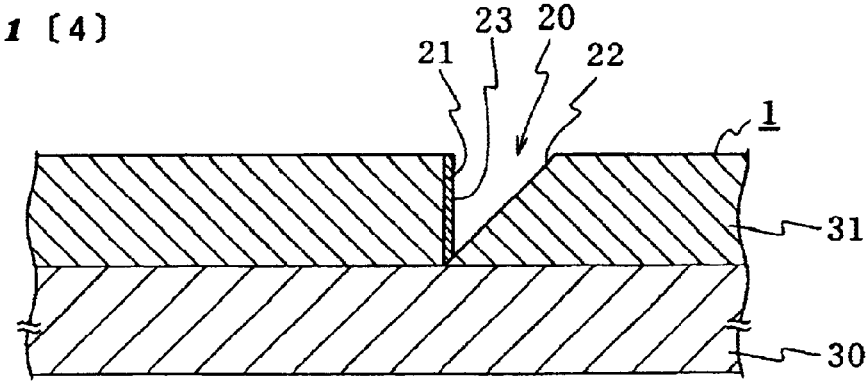
FIG. 11 (4)

FIG. 13
PRIOR ART
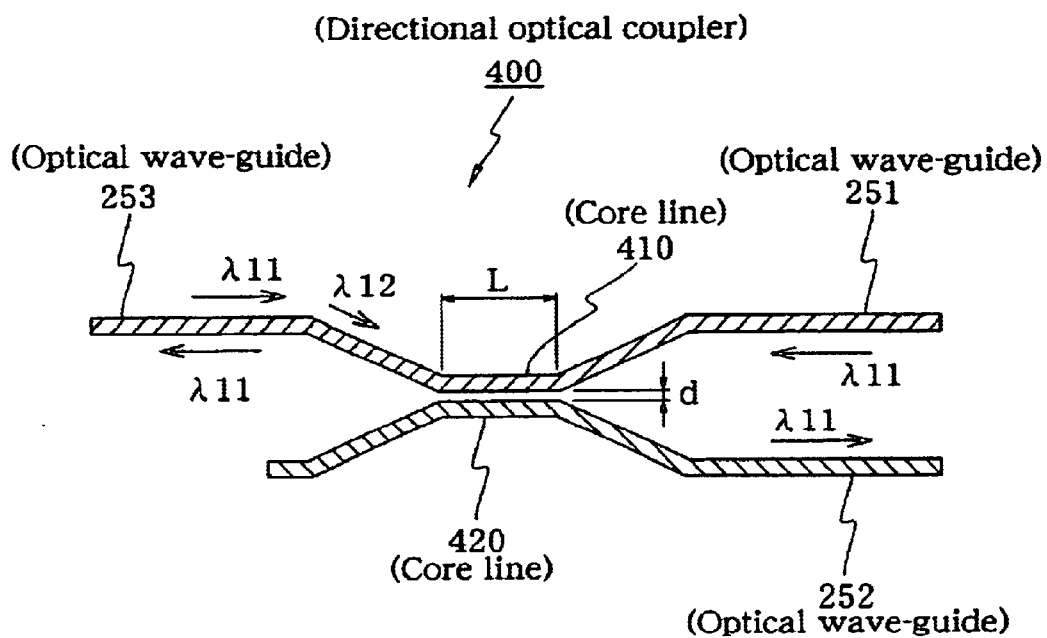
FIG. 13
PRIOR ART
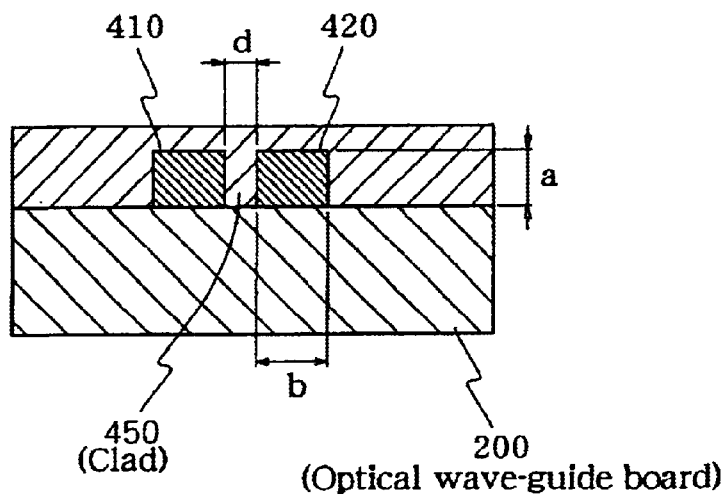

TWO-WAY OPTICAL COMMUNICATION MODULE AND METHOD FOR MANUFACTURING THE SAME

BACKGROUND OF THE INVENTION

1. Field of the Invention

The present invention relates to a two-way optical communication module for combining/splitting a transmission light and a reception light using a directional optical coupler.

2. Description of the Related Art

FIGS. 12–14 show a conventional two-way optical communication module disclosed in Japanese Patent Application Laid-Open No. Hei 5-289120. FIG. 12 is a diagram for showing an overall configuration, FIG. 13 is an expanded view for showing part of FIG. 12, FIG. 13 is a cross-sectional view for showing FIG. 13, and FIG. 14 is a graph for showing wavelength characteristics of a directional optical coupler. The following will describe the module with reference to these figures.

As shown in FIG. 12, on the surface of an optical wave-guide board 200 and near its one side are provided parallel an optical wave-guide 251 coupled optically to a light emitting element 210, an optical wave-guide 252 coupled optically to a light receiving element 220, and an optical wave-guide 254 coupled optically to a light receiving element 230. Near the other side of the optical wave-guide board 200 and on its surface, on the other hand, is provided a trunk optical wave-guide 250 coupled optically to an optical fiber 500. The trunk optical wave-guide 250 is divided into two branches, one of which provides an optical wave-guide 253 and the other of which provides an optical wave-guide 254.

The optical wave-guide 253 is further divided into two branches, one of which provides an optical wave-guide 251 and the other of which provides an optical wave-guide 252. At a Y-form junction of the trunk optical wave-guide 250 and the optical wave-guides 253 and 254 is provided a beam combiner/splitter (wave-guide type directional optical coupler or Mach-Zehnder type combiner/splitter) 220, which splits a light coming in through the optical fiber 500 into two components of a short-wavelength band λ11 and a long-wavelength band λ12 to transmit them through the optical wave-guides 253 and 254 respectively.

Further, at a Y-form junction of the optical wave-guides 251, 253, and 253 is provided a directional optical coupler 400 which gives a larger coupling loss in the long wavelength band λ12 to the optical wave-guide 252 than the others, thus preventing a leakage light of the long wavelength band λ12 going through the optical wave-guide 253 from coming into the light receiving element 220.

Further, the optical wave-guide 251 has the light emitting element 210 disposed at its injection end (that is, an end surface of the optical wave-guide board 200), while the optical wave-guide 252 has, as opposed thereto, a light receiving surface of the light receiving element 220 disposed at its emission end (that is, the end surface of the optical wave-guide board 200). Also, the optical wave-guide 254 has, as opposed thereto, a light receiving surface of the light receiving element 230 disposed at its emission end (that is, the end surface of the optical wave-guide board 200).

The following will detail the directional optical coupler 400 with reference to FIGS. 13 and 14.

As shown in FIG. 13, an interconnection of the optical wave-guides 253 and 251 is bent in a reverse trapezoid shape to provide a core line 410 and a light-incident end of the optical wave-guide 252 is bent in a trapezoid shape to provide a core line 420 near and parallel to the core line 410, thus implementing the directional optical coupler 400.

In one example of a configuration of the core lines 410 and 420, a width b is 6 [μm] and a height a is 6 [μm] to form a rectangle, a length L is 1.81 [μm], and a distance d between the core lines 410 and 420 is 3.6 [μm]. Also, the refractive index of the core lines 410 and 420 is 1.468 and that of a clad 450 is 1.457.

FIG. 14 shows a wavelength characteristic of the directional optical coupler 400. A dotted line P-1 in FIG. 14 indicates a relationship of a coupling loss and a wavelength between the optical wave-guides path 253 and 251, while a solid line P-2 indicates that between the optical wave-guides 253 and 252. Since the directional optical coupler 400 has such wavelength characteristics as shown in FIG. 14, by selecting a wavelength band centering around a value of 1.31 [μm] as the short-wavelength band λ11 and a wavelength band centering around a value of 1.55 [μm] as the long-wavelength band λ12, it is possible to prevent a light of the long-wavelength band λ12 from entering to the optical wave-guide 252, that is, the light receiving element 220.

In a conventional two-way optical communication module, a light of the short-wavelength band λ11 and that of the long-wavelength band λ12 emitted from the optical fiber 500 pass through the trunk optical wave-guide 250 and then enter the beam combiner/splitter 220 to be split in wavelength into the short-wavelength and long-wavelength bands λ11 and λ12. As a result, the light of the long-wavelength band λ12 goes along the optical wave-guide 254 and enters the light receiving element 230. The light of the short-wavelength band λ11 and a light of the long-wavelength band λ12 which has leaked from the beam combiner/splitter 220, on the other hand, go along the optical wave-guide 253 and pass through the directional optical coupler 400 so that only the light of the short-wavelength band λ11 may go along the optical wave-guide 252 to enter the light receiving element 220. In this case, the light of the short-wavelength band λ11 originated from the light emitting element 210 passes through the optical wave-guide 251, the directional optical coupler 400, the optical wave-guide 253, the beam combiner/splitter 220, and the trunk optical wave-guide 250 and then enters the optical fiber 500.

This conventional two-way optical communication module, however, permits a light of the short-wavelength band λ11 emitted from the light emitting element 210 to be divided and radiated when passing through the directional optical coupler but does not take into account how to control the lights thus divided and radiated. That is, in the detailed drawings of the directional optical coupler 400 shown in FIG. 13, one half of the light of the short-wavelength band λ11 issued from the optical wave-guide 251 is guided to the optical wave-guide 253, whereas the other half of the light is transferred in power to the core line 420 to be radiated from the cut end of the optical wave-guide 252. Thus radiated light is reflected irregularly in the two-way optical communication module to provide a stray light, which then enters the light receiving element 220 for the short-wavelength band λ11, thus deteriorating the reception sensitivity characteristics.

As shown in FIG. 13, the directional optical coupler 400 has such a construction that the distance between the two close core lines 410 and 420 made of the optical wave-guides becomes larger toward the cut end of the optical wave-guide 252. In this construction, therefore, the optical wave-guides are elongated, thus giving rise to a disadvantage of a difficulty to make compact the optical wave-guide board 200.

SUMMARY OF THE INVENTION

In view of the above, it is an object of the present invention to provide two-way optical communication module with improved reception sensitivity characteristics.

In order to achieve above mentioned object, a two-way optical communication module according to present invention comprising: a light emitting element for emitting a light with a first wavelength; a first optical wave-guide including, a curved wave-guide portion coupled to said light emitting element, and a straight wave-guide portion coupled to a core of an optical fiber; a light receiving element; a second optical wave-guide including, a curved wave-guide portion coupled to said light receiving element, and a straight wave-guide portion coupled to a clad of said optical fiber; and a directional optical coupler including said straight wave-guide portion of said first optical wave-guide and said straight wave-guide portion of said second optical wave-guide, for guiding a light with said first wavelength from said first optical wave-guide to said core of said optical fiber and a light with a second wavelength from said core of said optical fiber to said second optical wave-guide.

Here, said first wavelength and said second wavelength may be equal to each other. Further, said clad of said optical fiber and said straight wave-guide portion of said second optical wave-guide are coupled to each other with a gap provided therebetween, a value of said gap being designed so that a diameter of a spot of light on said optical fiber which is radiated from said straight wave-guide portion may be smaller than a fiber diameter of said optical fiber. Moreover, said directional optical coupler is replaced by a Mach-Zehnder type combiner/splitter, a wave-guide portion of said Mach-Zehnder type combiner/splitter replacing the straight wave-guide portion of said first and second optical wave-guide. Further more, an end of said straight wave-guide portion of said second optical wave-guide is bent externally in a radial direction or in a circumferential direction of said optical fiber.

In other word, above-mentioned two-way optical communication module has a configuration so that the leakage light appeared in the directional optical coupler is induced outside of the two-way optical communication module by inducing the leakage light to the clad of the optical fiber. By inducing the leakage light of the directional optical coupler to outside of the two-way optical communication module, thus, it is possible to suppress a stray light reflected irregularly in the two-way optical communication module. Moreover, at the directional optical coupler, two optical wave-guides can be introduced to the clad without large gap each other, thus the curved wave-guide is not required. As a result, a small optical wave-guide can be realized.

Moreover, a two-way optical communication module having an optical wave-guide board, said optical wave-guide board comprising thereon: a light emitting element for emitting a light with a first wavelength; a first optical wave-guide having one end thereof coupled to said light emitting element and the other end thereof coupled to a core of an optical fiber; a light receiving element; a second optical wave-guide having one end thereof coupled to said light receiving element; and a directional optical coupler which is comprised of part of said first optical wave-guide and part of said second optical wave-guide and which guides the light with said first wavelength from said first optical wave-guide to said core of said optical fiber and the light with a second wavelength from said core of said optical fiber to said second optical wave-guide. And on a surface of said optical wave-guide board is formed one trench perpendicular to an optical axis at said one end of said second optical wave-guide. This trench is comprised of a first wall surface through which the light with said second wavelength is emitted from said one end of said second optical wave-guide and a second wall surface by which the light with said second wavelength emitted from said first wall surface is reflected toward said light receiving element.

On said first wall surface is formed a first reflection film except part thereof where the light with said second wavelength is emitted. The stray light pass through the optical wave-guide board to the light receiving element is shut by the first reflection film.

Also, on said second end surface is formed a second reflection film at part thereof where the light with said second wavelength is reflected. The light with second wavelength emitted from the first wall surface is reflected on the second reflection film, thus, the light is induced to the light receiving element effectively.

Moreover, a method for manufacturing the two-way optical communication module according present invention, comprising the steps of: forming said trench in the surface of said optical wave-guide board; forming a metal film throughout said first and second wall surfaces; and removing said metal film except part thereof, thus forming said first and second reflection films. The first and second reflection film are formed by same metal film forming step and same metal film removing step at the same time.

Here, an electrode may be formed at same time to form the first and second reflection film. This electrode may be used for said light emitting element and said light receiving element.

BRIEF DESCRIPTION OF THE DRAWINGS

FIG. 9 is a cross-sectional view taken along line VIIIa—VIIIa of FIG. 8;

FIG. 9 is a cross-sectional view taken along line VIIIb—VIIIb of FIG. 8;

FIGS. 10[1] through 10[4] are sequential cross-sectional views which correspond to FIG. 9 for showing one embodiment of a two-way optical communication module manufacturing method related to the present invention, wherein FIG. 10 shows a first step, FIG. 10 shows a second step, FIG. 10 shows a third step, and FIG. 10 shows a fourth step;

FIGS. 11[1] through 11[4] are sequential cross-sectional views which correspond to FIG. 9 for showing the one embodiment of the two-way optical communication module manufacturing method related to the present invention, wherein FIG. 11 shows a first step, FIG. 11 shows a second step, FIG. 11 shows a third step, and FIG. 11 shows a fourth step;

FIG. 13 is an expanded view for showing part of FIG. 12;

FIG. 13 is a cross-sectional view for showing FIG. 13; and

DESCRIPTION OF THE PREFERRED EMBODIMENTS

First Embodiment

Figure 1:
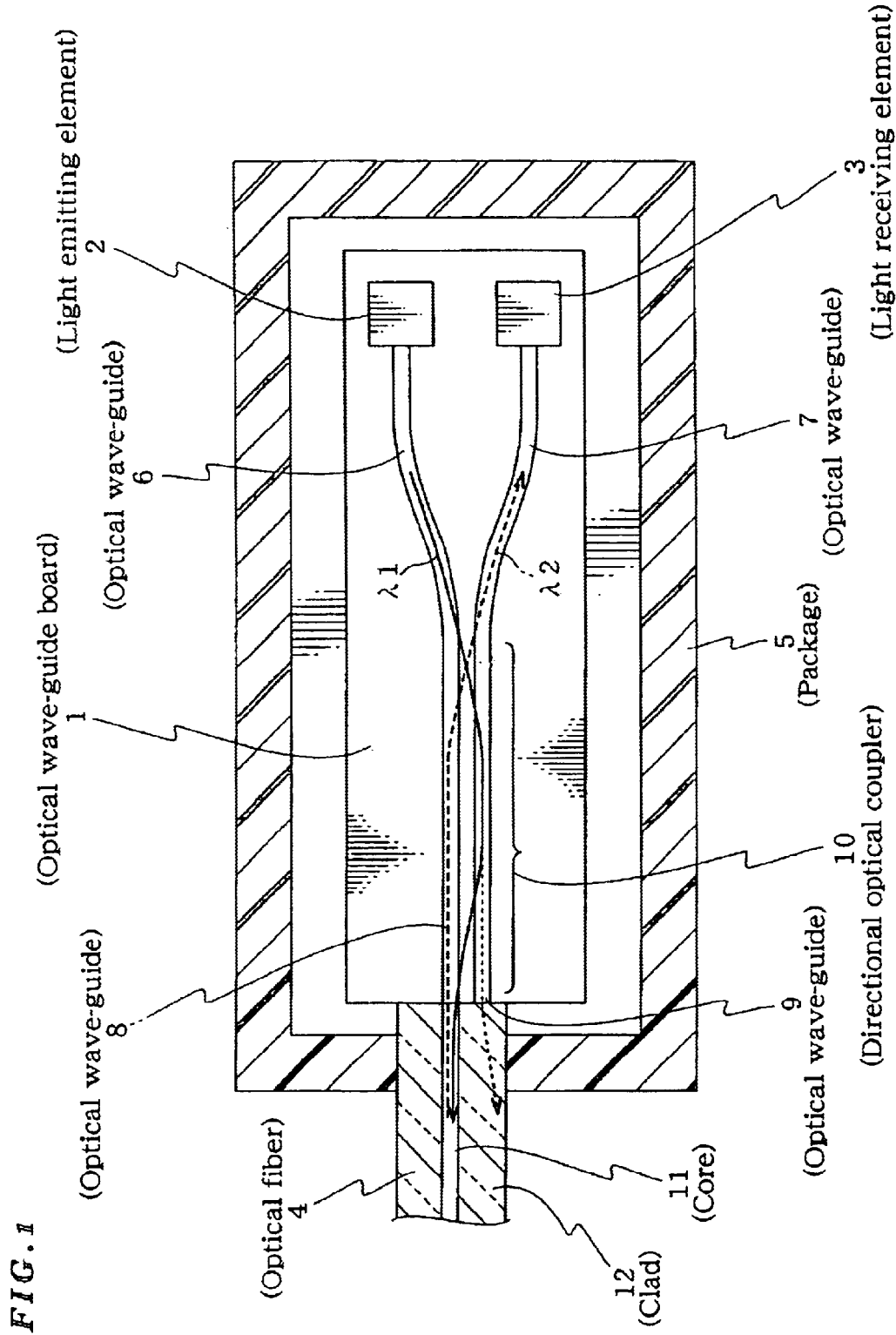
FIG. 1 is a diagram for showing a configuration of a first embodiment of a two-way optical communication module related to the present invention.

FIG. 1 is a configuration view showing two-way optical communication module of first embodiment according to present invention. The following will describe with reference to FIG. 1.

A two-way optical communication module of the present embodiment comprises: a light emitting element 2 for emitting a light with wavelength $\lambda 1$; a first optical wave-guide having a curved wave-guide portion (optical wave-guide 6) coupled to the light emitting element 2, and a straight wave-guide portion (optical wave-guide 8) coupled to a core 11 of an optical fiber 4; a light receiving element 3; a second optical wave-guide having a curved wave-guide portion (optical wave-guide 7) coupled to the light receiving element 3, and a straight wave-guide portion (optical wave-guide 9) coupled to a clad 12 of the optical fiber 4; and a directional optical coupler 10 including the optical wave-guides 8 and 9 for guiding a light with wavelength $\lambda 1$ from the optical wave-guide 6 to the core 11 and a light with wavelength $\lambda 2$ from the core 11 to the optical wave-guide 7.

In other words, the two-way optical communication module of the present embodiment comprises an optical wave-guide board 1, the light emitting element 2, the light receiving element 3, the optical fiber 4, a package 5, etc. The optical wave-guide board 1 is mounted with the light emitting element 2 and the light receiving element 3 thereon and is housed in the package 5 as fixed with the optical fiber 4.

On the optical wave-guide board 1 are formed the optical wave-guide 6 coupled with the light emitting element 2, the optical wave-guide 7 coupled with the light receiving element 3, the optical wave-guide 8 coupled with the core 11, and the optical wave-guide 9 which is adjacent the optical wave-guide 8 and connected to the clad 12. The optical wave-guides 6 and 7 are curved and the optical wave-guides 8 and 9 are straight in shape. The optical wave-guides 8 and 9 are combined with each other to form a directional optical coupler 10 for guiding a light with wavelength $\lambda 1$ to the optical wave-guide 6 and a light with wavelength $\lambda 2$ to the optical wave-guide 7. As the optical fiber 4 is mainly used a single-mode fiber with a fiber diameter of 125 [μm] and a core diameter of 10 [μm].

Figure 2:
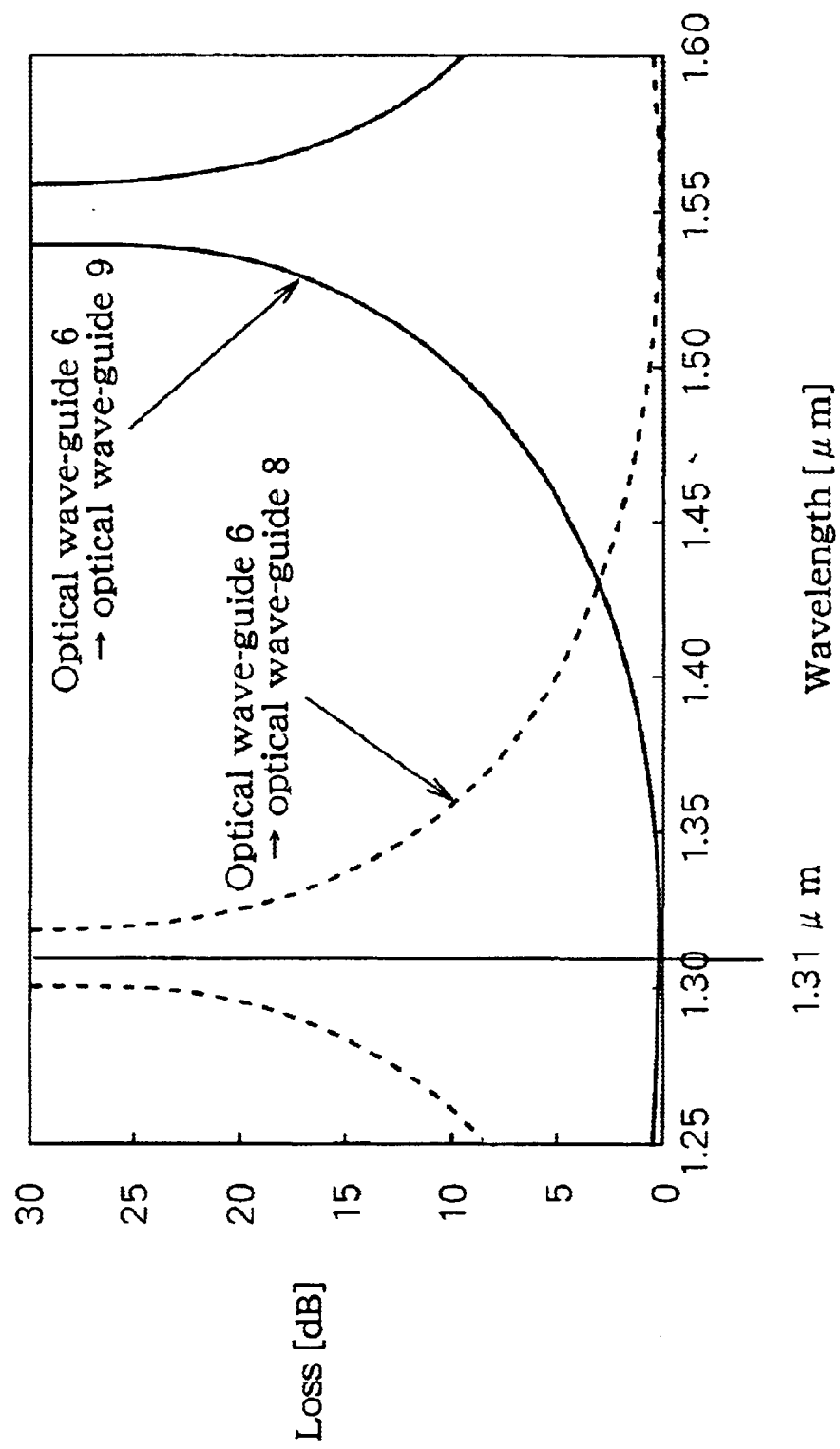
FIG. 2 is a graph for showing wavelength characteristics of a directional optical coupler in the two-way optical communication module of FIG. 1.

FIG. 2 is a graph for showing one example wavelength characteristics of a directional optical coupler 10. The following will describe with reference to FIGS. 1 and 2.

FIG. 2 shows the wavelength characteristics of the directional optical coupler 10 for the light from the optical wave guide 6. In the graph of FIG. 2, wavelength $\lambda 1 = \mu 1.55$ [μm] and wavelength $\lambda 2 = 1.31$ [μm]. When a light with wavelength $\lambda 1$ is injected from the optical wave-guide 6 into the directional optical coupler 10, its components are all issued from the optical wave-guide 8 with nothing thereof issued from the optical wave-guide 9. If wavelength $\lambda 1$ is shifted from the value of 1.55 μm or the refractive index of the optical wave-guide 8 or 9 is shifted from a design value, not all of the components of the light are issued from the optical wave-guide 8, so that a leakage light is issued from the optical wave-guide 9. This leakage light issued from the optical wave-guide 9 cannot be ignored in order to suppress the deteriorating of the reception sensitivity characteristics owing to a stray light in the two-way optical communication module. By the present embodiment, therefore, this leakage light passes in construction through the clad 12 to be guided out of the two-way optical communication module.

The following will describe the operations of the two-way optical communication module of the present embodiment.

A reception light with wavelength $\lambda 2$ injected from the core 11 is guided by the directional optical coupler 10 to the optical wave-guide 7 and received by the light receiving element 3. A transmission light with wavelength $\lambda 1$ emitted from the light emitting element 2 is guided by the directional optical coupler 10 to the optical wave-guide 8 and guided to the core 11. A leakage light with wavelength $\lambda 1$ sent from the directional optical coupler 10 to the optical wave-guide 9 passes through the clad 12 to then be guided out of the package 5. The light thus guided through the fiber clad 12 to the outside of the package 5 is radiated at a curved portion etc. of the optical fiber 4 along a transmission line and has no influence on the transmit light or the receive light transmitted through the core 11. It is thus possible to implement a two-way optical communication module having a function to guide a leakage light from the directional optical coupler 10 to the outside of the two-way optical communication module while transmitting the light with wavelength $\lambda 1$ and receiving the light with wavelength $\lambda 2$.

Second Embodiment

Figure 3:
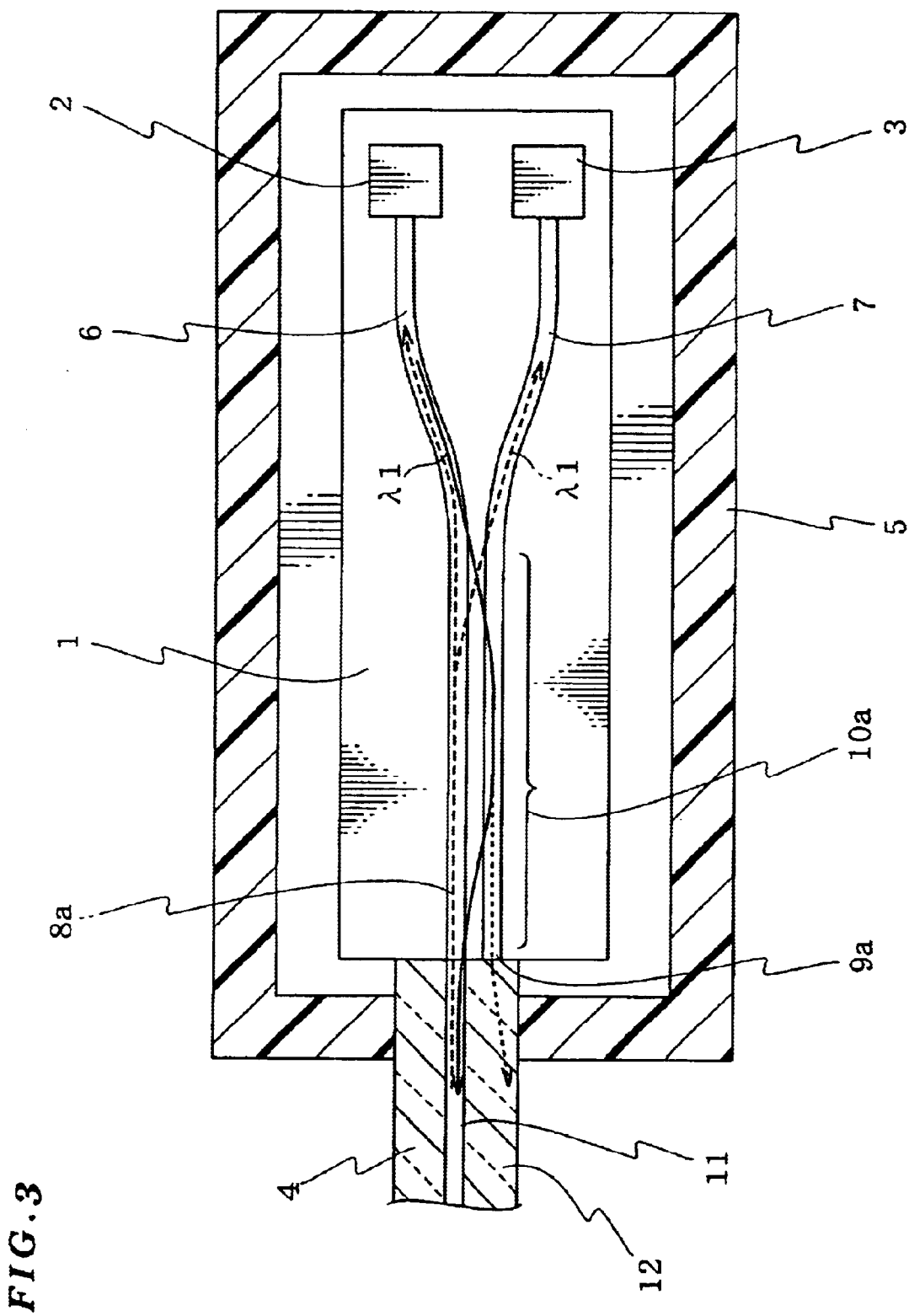
FIG. 3 is a diagram for showing a configuration of a second embodiment of the two-way optical communication module related to the present invention.

FIG. 3 is a configuration view showing two-way optical communication module of second embodiment according to present invention. The following will describe with reference to FIG. 3. The same components in FIG. 3 as those in FIG. 1 are indicated by the same reference numerals and their explanation is omitted.

In the two-way optical communication module of the present embodiment, a directional optical coupler 10a is changed in design so that a light with wavelength $\lambda 1$ may be divided into two branches of the optical wave-guides 6 and 7 by half and half. A reception light with wavelength $\lambda 1$ injected from the core 11 is divided by the directional optical coupler 10a into two branches of the optical wave-guides 6 and 7, so that the light guided through the optical wave-guide 7 is received by the light receiving element 3.

A transmission light with wavelength $\lambda 1$ emitted by the light emitting element 2 is divided by the directional optical coupler 10a into two branches of optical wave-guides 8a and 9a, so that the light guided through the optical wave-guide 8a is guided to the core 11. In this case, the light guided through the optical wave-guide 9a in the directional optical coupler 10a passes through the clad 12 to be guided out of the package 5. It is thus possible to implement a two-way optical communication module which has a function to guide the divided light in the directional optical coupler 10a out of the two-way optical communication module.

In the present embodiment, the directional optical coupler 10a is used as a 3-dB coupler, so that a light radiated from the optical wave-guide 9a has a very large optical power, almost the same as a fiber power. To suppress the influences of the stray light, therefore, it is very effective to guide the divided light in the directional optical coupler 10a to the outside of the two-way optical communication module. Also, although in the present embodiment the dividing ratio of the directional optical coupler is 1:1, it may be of any value in design.

Third Embodiment

Figure 4:
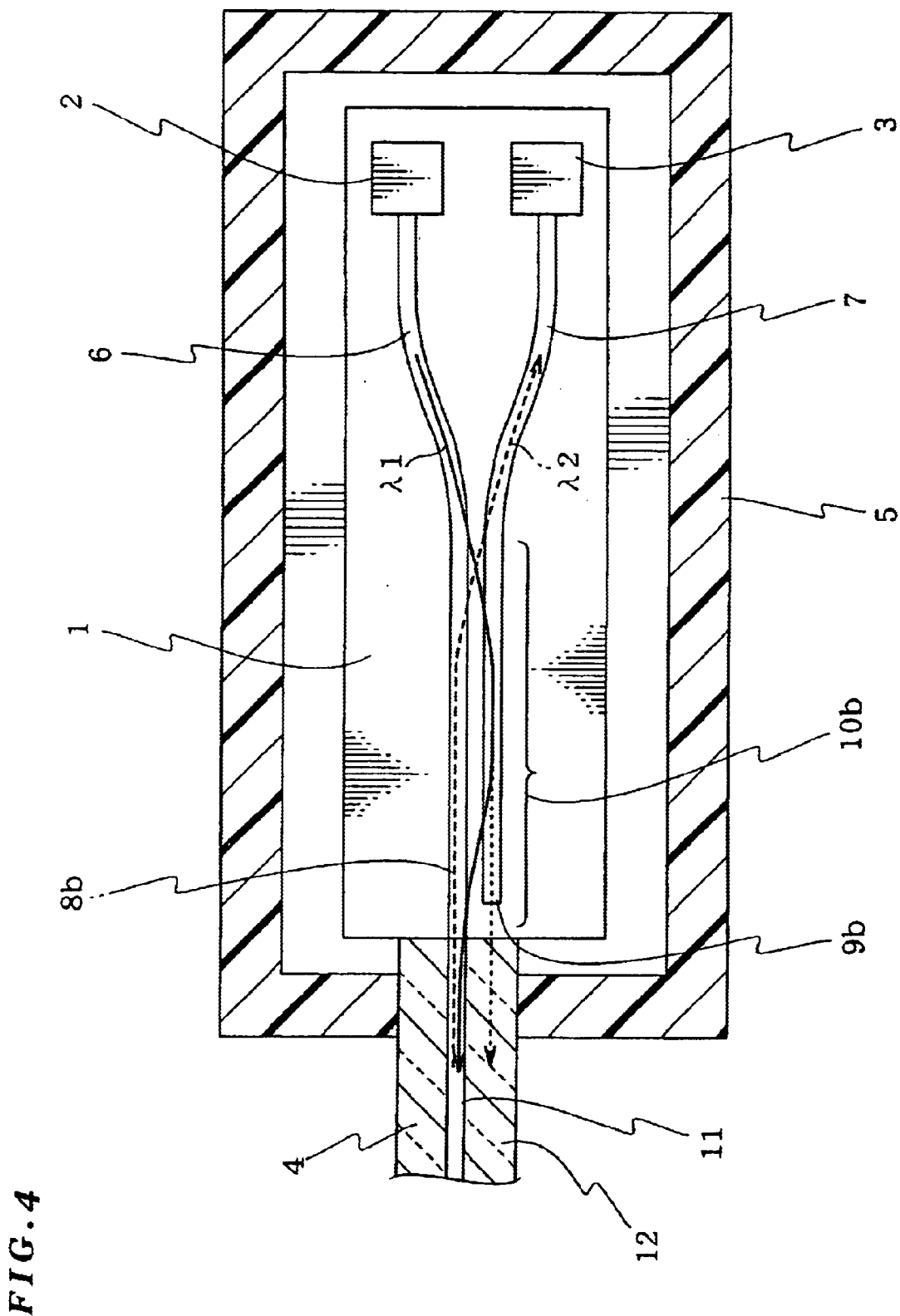
FIG. 4 is a diagram for showing a configuration of a third embodiment of the two-way optical communication module related to the present invention.

FIG. 4 is a configuration view showing two-way optical communication module of third embodiment according to present invention. The following will describe with reference to FIG. 4. The same components in FIG. 4 as those in FIG. 1 are indicated by the same reference numerals and their explanation is omitted.

In a construction of the two-way optical communication module of the present embodiment, an optical wave-guide 9b is not formed up to an end surface of the optical wave-guide board 1 but is cut halfway. Due to this construction, a leakage light radiated from the optical wave-guide 9b propagates over the optical wave-guide board 1 as spreading. The optical wave-guide board 1, however, is designed so that a spot diameter of the leakage light at the end surface thereof may be smaller than a fiber diameter of the optical fiber 4, thus making the all components of the leakage light incident to the clad 12. It is thus possible to implement a two-way optical communication module having the same function as that by the first embodiment.

Fourth Embodiment

Figure 5:
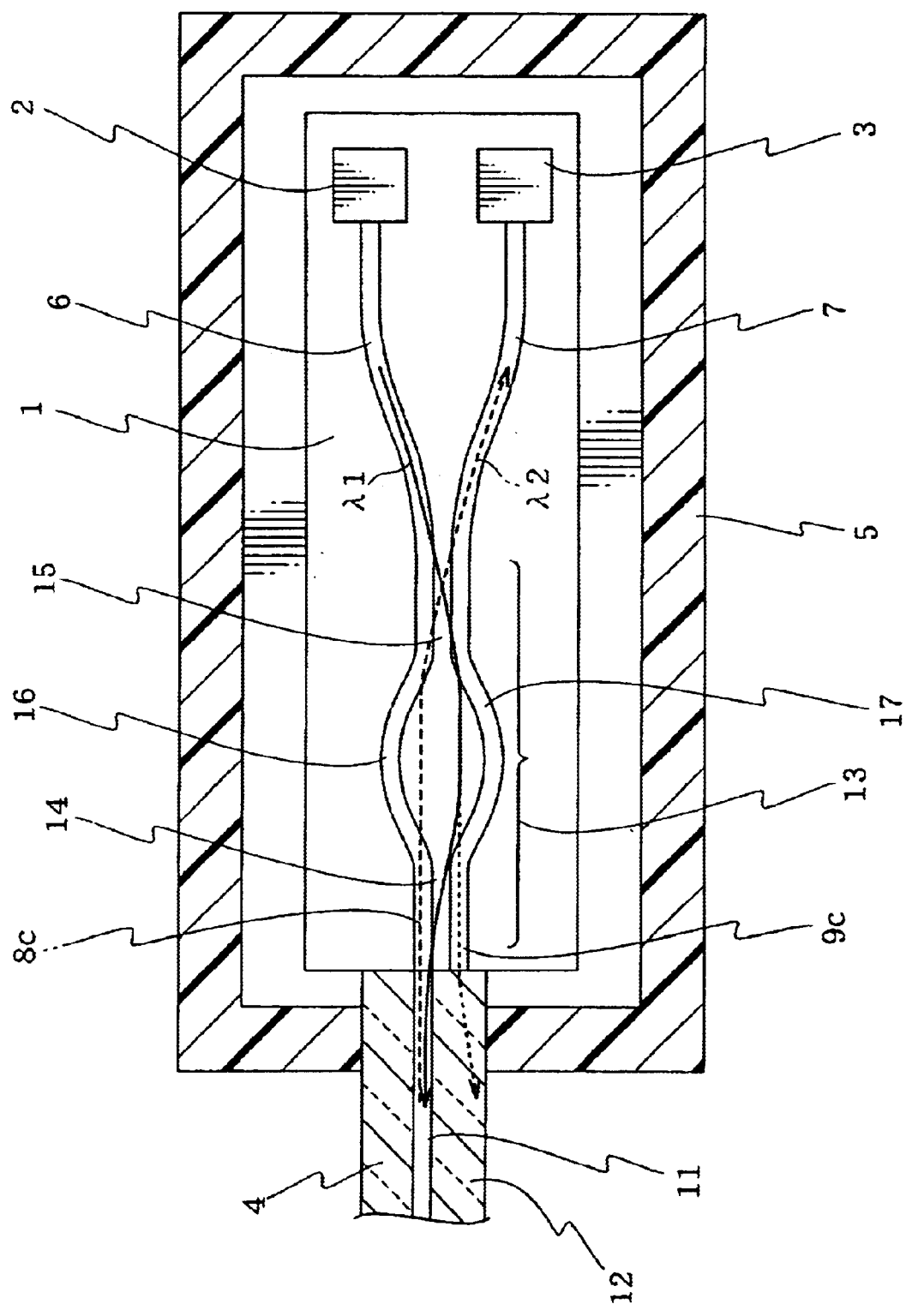
FIG. 5 is a diagram for showing a configuration of a fourth embodiment of the two-way optical communication module related to the present invention.

FIG. 5 is a configuration view showing two-way optical communication module of fouth embodiment according to present invention. The following will describe with reference to FIG. 5. The same components in FIG. 5 as those in FIG. 1 are indicated by the same reference numerals and their explanation is omitted.

The two-way optical communication module of the present embodiment employs a Mach-Zehnder type combiner/splitter 13 in place of the directional optical coupler 10 in the first embodiment. The Mach-Zehnder type combiner/splitter 13 is comprised of a first combiner/splitter 14, a second combiner/splitter 15, an optical wave-guide 16, an optical wave-guide 17, etc. A reception light with wavelength $\lambda 2$ injected from the core 11 is guided by the Mach-Zehnder type combiner/splitter 13 to the optical wave-guide 7 to be received by the light receiving element 3.

A transmission light with wavelength $\lambda 1$ emitted by the light emitting element 2, on the other hand, is guided by the Mach-Zehnder type combiner/splitter 13 to an optical wave-guide 8c to be guided to the core 11. At the same time, a leakage light with wavelength $\lambda 1$ injected to the optical wave-guide 9c in the Mach-Zehnder type combiner/splitter 13 passes through the clad 12 to be guided out of the package 5. It is thus possible to implement a two-way optical communication module which has a function to transmit the light with wavelength $\lambda 1$ and also receive the light with wavelength $\lambda 2$ and also guide the leakage light from the Mach-Zehnder type combiner/splitter 13 to the outside of the two-way optical communication module.

Fifth Embodiment

Figure 6:
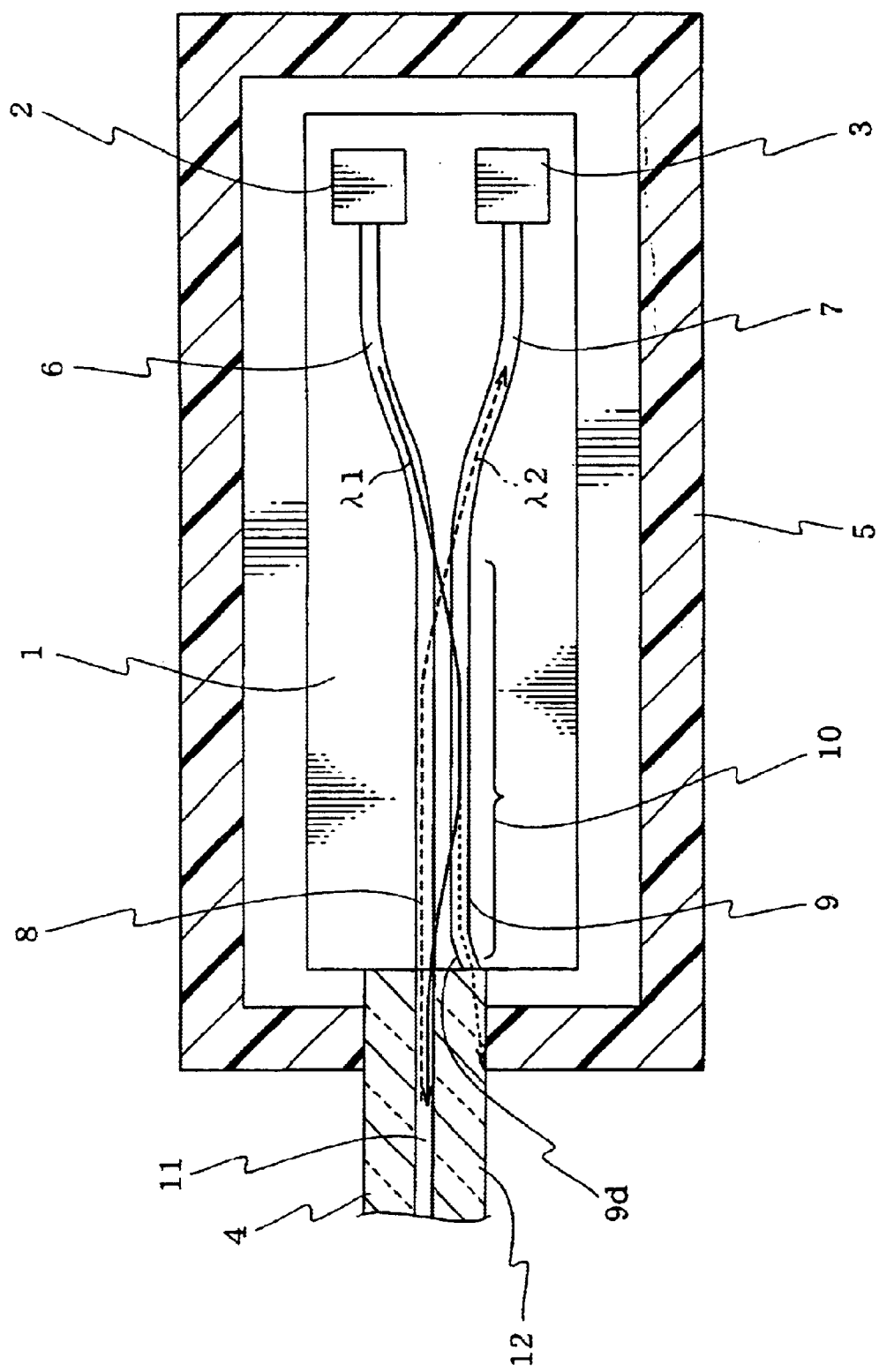
FIG. 6 is a diagram for showing a configuration of a fifth embodiment of the two-way optical communication module related to the present invention.

FIG. 6 is a configuration view showing two-way optical communication module of fifth embodiment according to present invention. The following will describe with reference to FIG. 6. The same components in FIG. 6 as those in FIG. 1 are indicated by the same reference numerals and their explanation is omitted.

In the two-way optical communication module of the present embodiment, an end 9d of the optical wave-guide 9 is bent externally in a radial direction of the optical fiber 4. A transmission light with wavelength $\lambda 1$ emitted by the light emitting element 2 is guided by the directional optical coupler 10 to the optical wave-guide 8 to be guided to the core 11. At the same time, a leakage light with wavelength $\lambda 1$ injected from the directional optical coupler 10 to the optical wave-guide 9 passes an end 9d and the clad 12 in this order to be guided out of the package 5. The light thus guided out of the package 5 from the clad 12 is radiated out of the optical fiber 4 more effectively because the end 9d of the optical wave-guide 9 is bent externally in the radial direction of the optical fiber 4 than otherwise. Almost the same actions and effects can be obtained also when the end 9d of the optical wave-guide 9 is bent in a circumferential direction of the optical fiber.

Sixth Embodiment

Figure 7:
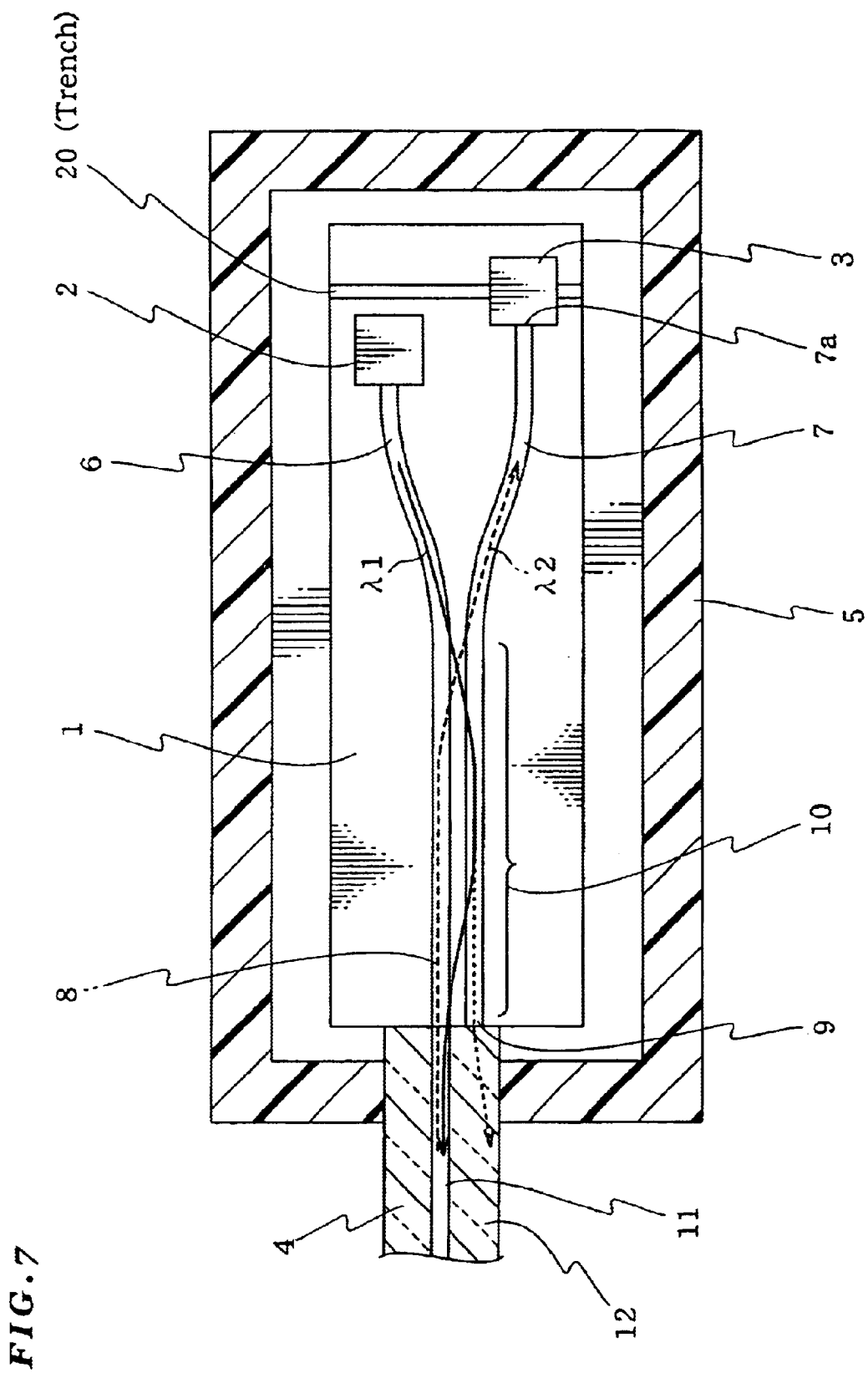
FIG. 7 is a diagram for showing a configuration of a sixth embodiment of the two-way optical communication module related to the present invention.

FIG. 7 is a configuration view showing two-way optical communication module of sixth embodiment according to present invention. The following will describe with reference to FIG. 7. The same components in FIG. 7 as those in FIG. 1 are indicated by the same reference numerals and their explanation is omitted.

In the two-way optical communication module of the present embodiment, on the surface of the optical wave-guide board 1 is formed one such trench 20 at an end 7a of the optical wave-guide 7 as to be perpendicular to the optical axis.

Figure 8:
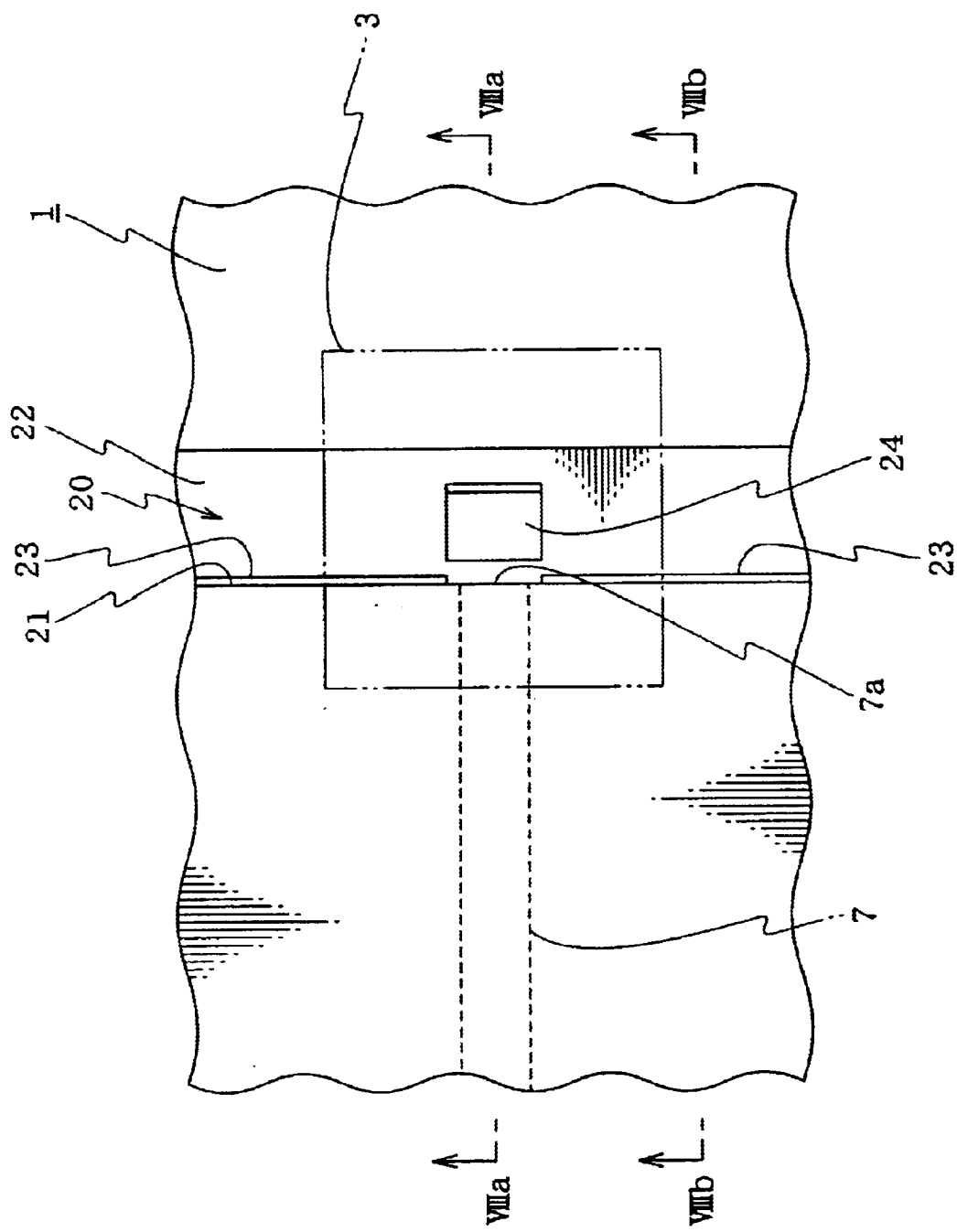
FIG. 8 is an expanded view for showing part near a light receiving element in FIG. 7.

FIG. 8 is an expanded view for showing part near a light receiving element in FIG. 7. FIG. 9 is a cross-sectional view taken along line VIIIa—VIIIa of FIG. 8. FIG. 9 is a cross-sectional view taken along line VIIIb—VIIIb of FIG. 8. The following description is made with reference to FIGS. 8 and 9.

The trench 20 is comprised of a wall surface 21 through which a light with wavelength $\lambda 2$ is emitted from the end surface 7a of the optical wave-guide 7 and a wall surface 22 by which the light with wavelength $\lambda 2$ emitted from the wall surface 21 is reflected toward the light receiving element 3. On the wall surface 21 is formed a reflection film 23 except part of the wall surface 21 where the light with wavelength $\lambda 2$ is emitted. On the wall surface 22 is formed a reflection film 24 where the light with wavelength $\lambda 2$ is reflected. Note here that the optical wave-guide board 1 comprises a silicon substrate 30 and a silicon oxide layer 31 formed thereon. At part of the silicon oxide layer 31 is formed the optical wave-guide 7.

A stray light P going through the optical wave-guide board 1 toward the light receiving element 3 is blocked by the reflection film 21 (see FIG. 9). This decreases noise at the light receiving element 3. The light with wavelength λ2, on the other hand, is reflected by the reflection film 24 and so guided to the light receiving element 3 effectively more than a case where the reflection film 24 is not provided (see FIG. 9). This increases a signal at the light receiving element 3 in magnitude. This in turn improves an S/N ratio of the light receiving element 3.

Figure 12:
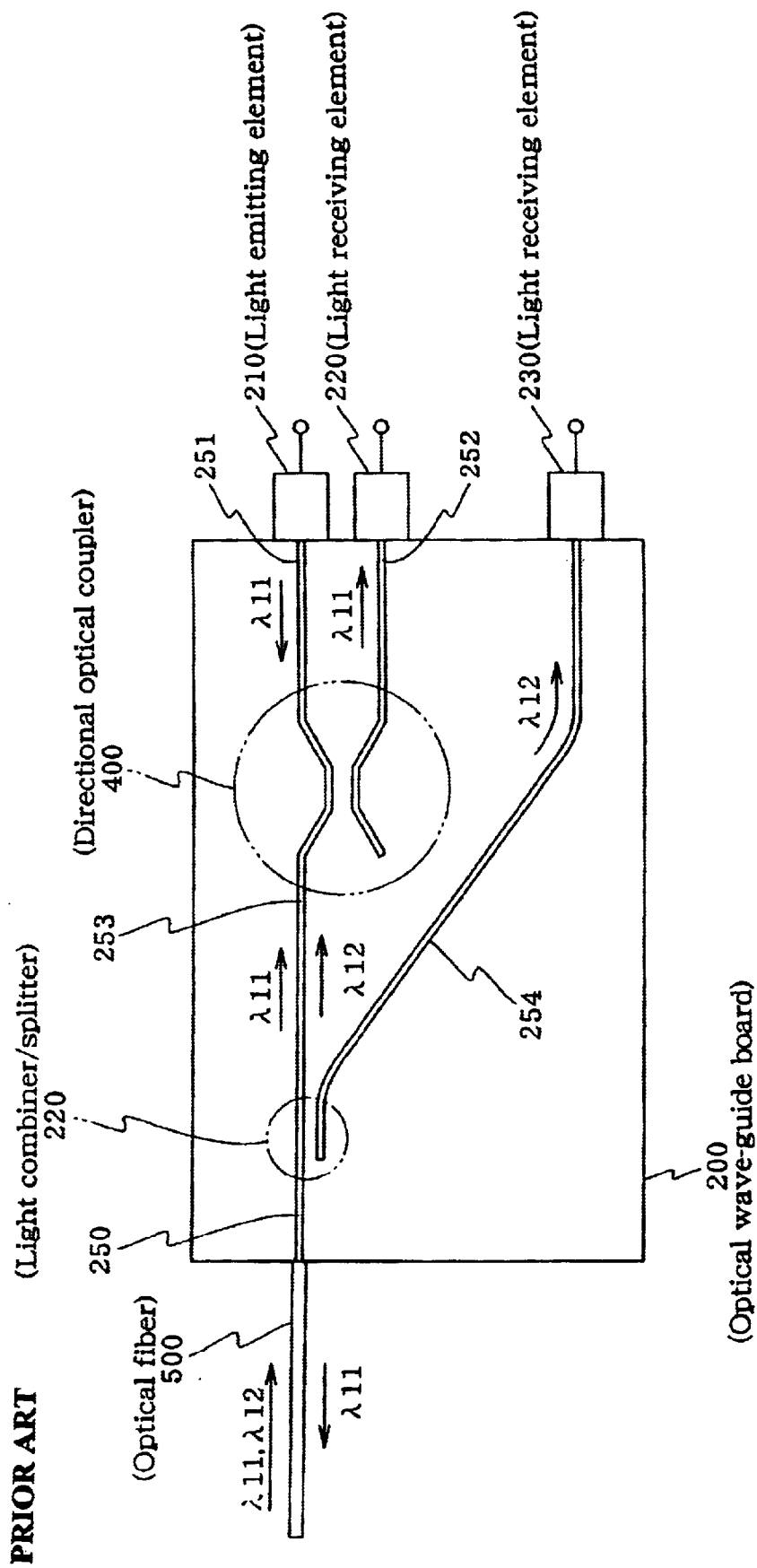
FIG. 12 a diagram for showing an overall configuration of a conventional two-way optical communication module.
Figure 14:
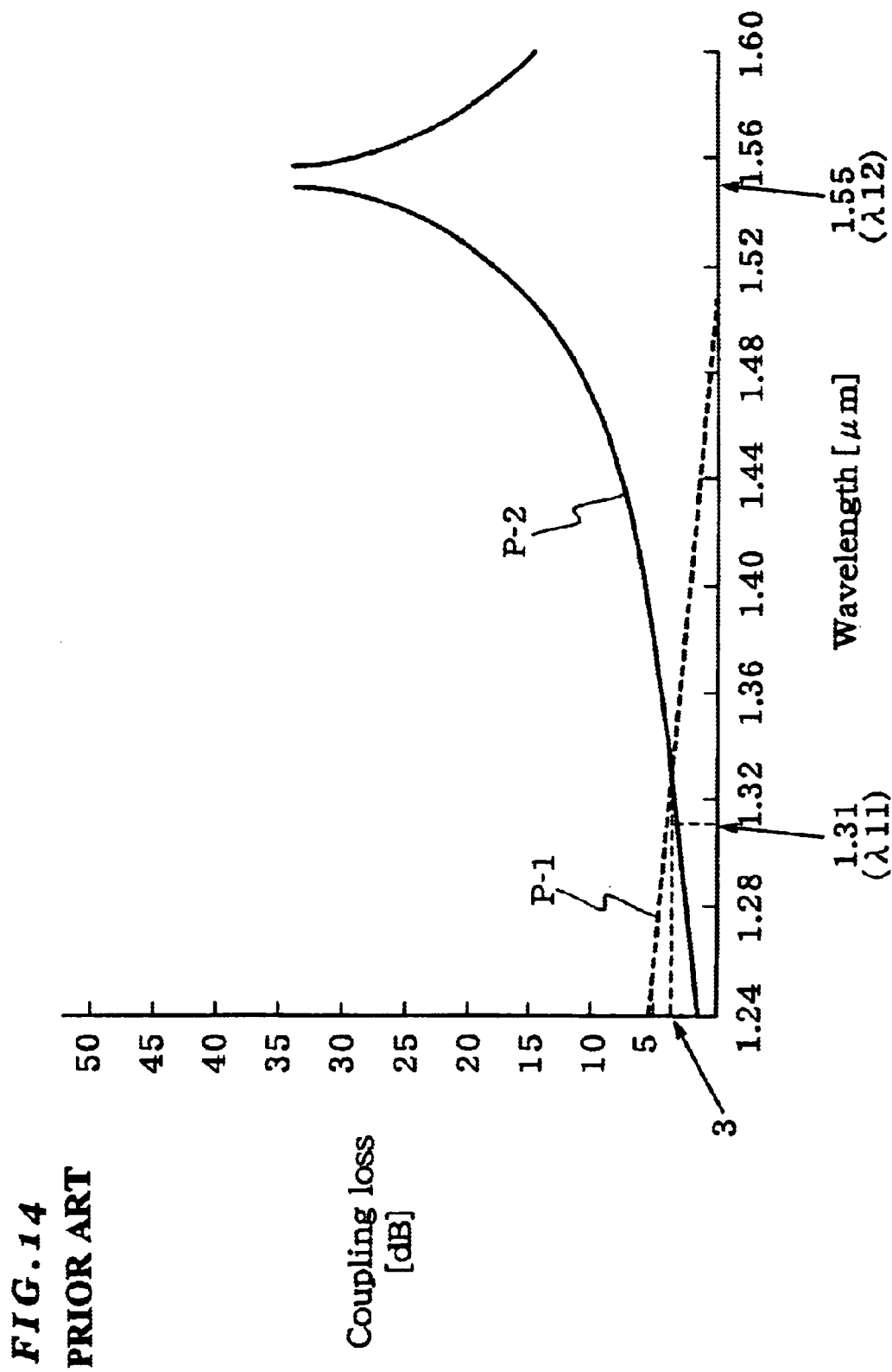
FIG. 14 is a graph for showing wavelength characteristics of a directional optical coupler in the two-way optical communication module of FIG. 12.

Note here that the construction of the optical wave-guides 8 and 9 is not limited to that of the first embodiment but may be the conventional one shown in FIGS. 12 and 13, for example.

FIGS. 10 and 11 are cross-section view showing one embodiment of manufacturing method according to present invention. The steps from FIG. 10 to FIG. 10 proceed in this order. The steps from FIG. 11 to FIG. 11 proceed in this order. Here, FIG. 10 correspond to FIG. 9 and FIG. 11 correspond to FIG. 9. The same components in these figures as those in FIG. 9 are indicated by the same reference numerals and their explanation is omitted.

The present embodiment provides a method for manufacturing the two-way optical communication module according to the sixth embodiment. First, a blade 32 of a dicing saw is used to form the trench 20 on the surface of the optical wave-guide board 1 (see FIG. 10 and FIG. 11). At this step, as in the case by use of a typical semiconductor device manufacturing technology, a region where the optical wave-guide board 1 to be formed is provided many on one silicon wafer, in which is then formed the trench 20 many consecutively.

Next, throughout the surface of the optical wave-guide board 1 including the wall surfaces 21 and 22 is formed an Au film 33 using a film formation technology such as evaporation, sputtering, plating, etc. (see FIG. 10 and FIG. 11). In this case, Au may be replaced by Ag or Al, for example.

Next, on a portion where the Au film 33 is to be left are formed photo-resist films 34a and 34b by photolithography (see FIG. 10 and FIG. 11).

Finally, using dry etching or wet etching, a portion of the Au film 33 is removed which is not covered by the photo-resist film 34a or 34b (see FIG. 10 and FIG. 11). As a result, the reflection films 23 and 24 are formed. At the same time, an electrode not shown is formed which is used in the light receiving element or the light emitting element.

Thus, the reflection films 23 and 24 and the electrode (not shown) are formed simultaneously by the same metal film formation step and metal film removing step. It is thus possible to simplify the manufacturing steps as compared to a case of employing a method for forming the reflection films 23 and 24 and the electrode (not shown) in different steps.

Note here that prior to forming the Au film 33 the photo-resist films may be formed to form the reflection films 23 and 24 using a lift-off technology. Alternatively, instead of forming the photo-resist films, the Au film 33 may be removed directly using an ion milling technology etc.

The two-way optical communication module according to claims 1 through 5 gives the following effects.

For example, by the first effect, the reception sensitivity characteristics can be improved. Since a leakage light from the directional optical coupler can be guided out of the two-way optical communication module in construction, occurrence of a stray light can be suppressed in the two-way optical communication module, thus greatly reducing the quantity of the stray light which enters the light receiving element. It is thus possible to prevent deterioration of the reception sensitivity owing to the stray light.

By the second effect, the configuration of the two-way optical communication module can be simplified. In the conventional construction, to prevent a stray light caused by leakage from the directional optical coupler from entering the light receiving element, such a countermeasure has been necessary as to block or absorb the stray light. In contrast, by the construction of the present invention, the leakage light from the directional optical coupler can be guided out of the two-way optical communication module to thereby eliminate the necessity of the stray-light preventing measures by the conventional construction, thus simplifying the configuration of the two-way optical communication module.

By the third effect, the optical wave-guide board can be miniaturized. In the conventional construction of the directional optical coupler by which a stray light is not guided to the outside, it is necessary to make the distance between the two optical wave-guides at their coupling with an optical fiber larger than the diameter of the optical fiber, so that a curved wave-guide at the fiber coupling is elongated, thus making it difficult to miniaturize the optical wave-guide board. In contrast, in the directional optical coupler by the present invention, the two optical wave-guides are guided directly to the fiber clad without increasing the distance therebetween to thereby eliminate the necessity of the curved wave-guide on the side of the optical fiber, thus making it possible to miniaturize the optical wave-guide board.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-202410 (Filed on Jul. 3, 2001) including specification, claims, drawings and summary are incorporated herein by reference in its entirety.

What is claimed is:

1. A two-way optical communication module comprising:
   a light emitting element for emitting a light with a first wavelength;
   a first optical wave-guide including, a curved wave-guide portion coupled to said light emitting element, and a straight wave-guide portion coupled to a core of an optical fiber;
   a light receiving element;
   a second optical wave-guide including, a curved wave-guide portion coupled to said light receiving element, and a straight wave-guide portion coupled to a clad of said optical fiber; and
   a directional optical coupler including said straight wave-guide portion of said first optical wave-guide and said straight wave-guide portion of said second optical wave-guide, for guiding a light with said first wavelength from said first optical wave-guide to said core of said optical fiber and a light with a second wavelength from said core of said optical fiber to said second optical wave-guide.

2. The two-way optical communication module according to claim 1, wherein said first wavelength and said second wavelength are equal to each other.

3. The two-way optical communication module according to claim 1, wherein said clad of said optical fiber and said straight wave-guide portion of said second optical wave-guide are coupled to each other with a gap provided therebetween, a value of said gap being designed so that a diameter of a spot of light on said optical fiber which is radiated from said straight wave-guide portion may be smaller than a fiber diameter of said optical fiber.

4. The two-way optical communication module according to claim 2, wherein said clad of said optical fiber and said straight wave-guide portion of said second optical wave-guide are coupled to each other with a gap provided therebetween, a value of said gap being designed so that a diameter of a spot of light on said optical fiber which is radiated from said straight wave-guide portion may be smaller than a fiber diameter of said optical fiber.

5. The two-way optical communication module according to claim 1, wherein said directional optical coupler is replaced by a Mach-Zehnder type combiner/splitter, a wave-guide portion of said Mach-Zehnder type combiner/splitter replacing the straight wave-guide portion of said first and second optical wave-guide.

6. The two-way optical communication module according to claim 1, wherein an end of said straight wave-guide portion of said second optical wave-guide is bent externally in a radial direction or in a circumferential direction of said optical fiber.

7. The two-way optical communication module according to claim 2, wherein an end of said straight wave-guide portion of said second optical wave-guide is bent externally in a radial direction or in a circumferential direction of said optical fiber.

8. The two-way optical communication module according to claim 3, wherein an end of said straight wave-guide portion of said second optical wave-guide is bent externally in a radial direction or in a circumferential direction of said optical fiber.

9. The two-way optical communication module according to claim 4, wherein an end of said straight wave-guide portion of said second optical wave-guide is bent externally in a radial direction or in a circumferential direction of said optical fiber.

10. A two-way optical communication module having an optical wave-guide board, said optical wave-guide board comprising thereon:
   a light emitting element for emitting a light with a first wavelength;
   a first optical wave-guide having one end thereof coupled to said light emitting element and the other end thereof coupled to a core of an optical fiber;
   a light receiving element;
   a second optical wave-guide having one end thereof coupled to said light receiving element; and
   a directional optical coupler which is comprised of part of said first optical wave-guide and part of said second optical wave-guide and which guides the light with said first wavelength from said first optical wave-guide to said core of said optical fiber and the light with a second wavelength from said core of said optical fiber to said second optical wave-guide, wherein:
      on a surface of said optical wave-guide board is formed one trench perpendicular to an optical axis at said one end of said second optical wave-guide;
      said trench is comprised of a first wall surface through which the light with said second wavelength is emitted from said one end of said second optical wave-guide and a second wall surface by which the light with said second wavelength emitted from said first wall surface is reflected toward said light receiving element; and
      on said first wall surface is formed a first reflection film except part thereof where the light with said second wavelength is emitted.

11. The two-way optical communication module according to claim 10, wherein on said second end surface is formed a second reflection film at part thereof where the light with said second wavelength is reflected.

12. A method for manufacturing the two-way optical communication module including an optical wave-guide board, said optical wave-guide board comprising thereon: a light emitting element for emitting a light with a first wavelength; a first optical wave-guide having one end thereof coupled to said light emitting element and the other end thereof coupled to a core of an optical fiber; a light receiving element; a second optical wave-guide having one end thereof coupled to said light receiving element; and a directional optical coupler which is comprised of part of said first optical wave-guide and part of said second optical wave-guide and which guides the light with said first wavelength from said first optical wave-guide to said core of said optical fiber and the light with a second wavelength from said core of said optical fiber to said second optical wave-guide, wherein: on a surface of said optical wave-guide board is formed one trench perpendicular to an optical axis at said one end of said second optical wave-guide; said trench is comprised of a first wall surface through which the light with said second wavelength is emitted from said one end of said second optical wave-guide and a second wall surface by which the light with said second wavelength emitted from said first wall surface is reflected toward said light receiving element; and on said first wall surface is formed a first reflection film except part thereof where the light with said second wavelength is emitted; wherein on said second end surface is formed a second reflection film at part thereof where the light with said second wavelength is reflected; the method comprising the steps of:
   forming said trench in the surface of said optical wave-guide board;
   forming a metal film throughout said first and second wall surfaces; and
   removing said metal film except part thereof, thus forming said first and second reflection films.

13. A method for manufacturing the two-way optical communication module including an optical wave-guide board, said optical wave-guide board comprising thereon: a light emitting element for emitting a light with a first wavelength; a first optical wave-guide having one end thereof coupled to said light emitting element and the other end thereof coupled to a core of an optical fiber; a light receiving element; a second optical wave-guide having one end thereof coupled to said light receiving element; and a directional optical coupler which is comprised of part of said first optical wave-guide and part of said second optical wave-guide and which guides the light with said first wavelength from said first optical wave-guide to said core of said optical fiber and the light with a second wavelength from said core of said optical fiber to said second optical wave-guide, wherein: on a surface of said optical wave-guide board is formed one trench perpendicular to an optical axis at said one end of said second optical wave-guide; said trench is comprised of a first wall surface through which the light with said second wavelength is emitted from said one end of said second optical wave-guide and a second wall surface by which the light with said second wavelength emitted from said first wall surface is reflected toward said light receiving element; and on said first wall surface is formed a first reflection film except part thereof where the light with said second wavelength is emitted; wherein on said second end surface is formed a second reflection film at part thereof where the light with said second wavelength is reflected; the method comprising the steps of:

forming said trench in the surface of said optical wave-guide board;

forming a metal film throughout the surface of said optical wave-guide board including said first and second wall surfaces; and removing said metal film except part thereof, thus forming said first and second reflection films and an electrode.

14. The method according to claim 13, wherein said electrode is used for said light emitting element and said light receiving element.

\* \* \* \* \*